US011890622B2

(12) United States Patent
Chien et al.

(10) Patent No.: US 11,890,622 B2
(45) Date of Patent: Feb. 6, 2024

(54) WEARABLE AIR PURIFIER

(71) Applicant: ible Technology Inc., Taipei (TW)

(72) Inventors: Hung-Hsuan Chien, Taipei (TW); Yu-Fan Tsai, New Taipei (TW)

(73) Assignee: ible Technology Inc., Taipei (TW)

( * ) Notice: Subject to any disclaimer, the term of this patent is extended or adjusted under 35 U.S.C. 154(b) by 275 days.

(21) Appl. No.: 17/382,308

(22) Filed: Jul. 21, 2021

(65) Prior Publication Data

US 2022/0032318 A1 Feb. 3, 2022

Related U.S. Application Data

(60) Provisional application No. 63/058,497, filed on Jul. 30, 2020.

(51) Int. Cl.

| | |
|---|---|
| ***B03C 3/32*** | (2006.01) |
| ***H01T 19/00*** | (2006.01) |
| ***H01T 23/00*** | (2006.01) |
| ***H04R 3/00*** | (2006.01) |
| ***B03C 3/38*** | (2006.01) |

(Continued)

(52) U.S. Cl.

CPC .................. *B03C 3/32* (2013.01); *B03C 3/38* (2013.01); *B03C 3/68* (2013.01); *H01T 19/00* (2013.01);

(Continued)

(58) Field of Classification Search

CPC ......... A61L 9/22; H04R 1/1016; H04R 1/026; H04R 1/1066; H04R 1/1075;

(Continued)

(56) References Cited

U.S. PATENT DOCUMENTS 5,484,472 A * 1/1996 Weinberg .................. B03C 3/66 96/80
2003/0001479 A1* 1/2003 Aiki ........................ H01T 23/00 313/325

(Continued)

FOREIGN PATENT DOCUMENTS

CN 101677420 A 3/2010
CN 101677420 B 10/2012

(Continued)

OTHER PUBLICATIONS

"International Search Report" dated Oct. 28, 2021 for International application No. PCT/CN2021/000160, International filing date:Jul. 28, 2021.

*Primary Examiner* — Christopher P Jones
*Assistant Examiner* — Sonji Turner
(74) *Attorney, Agent, or Firm* — Winston Hsu

(57) ABSTRACT

A wearable air purifier includes at least one wearable component, a control unit, at least one speaker assembly and at least one negative ion generating component. The control unit is disposed inside the at least one wearable component. The at least one speaker assembly is disposed on the at least one wearable component and electrically connected to the control unit. The at least one negative ion generating component is disposed on the at least one wearable component and electrically connected to the control unit. The control unit provides high-voltage currents to the at least one negative ion generating component to enable the at least one negative ion generating component to emit negative ions by corona discharging, and the control unit further provides audio signals to the at least one speaker assembly to activate the at least one speaker assembly to generate sound.

17 Claims, 9 Drawing Sheets

(51) Int. Cl.
*H04R 1/02* (2006.01)
*B03C 3/68* (2006.01)

(52) U.S. Cl.
CPC ............. *H01T 23/00* (2013.01); *H04R 1/028* (2013.01); *H04R 3/00* (2013.01)

(58) Field of Classification Search
CPC ........ H04R 1/1025; H04R 1/10; H04R 9/025; H04R 19/02; H04R 1/288; H04R 1/025; H04R 1/028; H04R 1/1083; H04R 1/1091; H04R 9/06; B60H 3/0078; B60H 3/0071; A42B 1/24; G02C 11/10; G02C 11/06; H01T 23/00
See application file for complete search history.

(56) References Cited

U.S. PATENT DOCUMENTS

| | | | | |
|---|---|---|---|---|
| 2018/0063620 | A1 | 3/2018 | Kim | |
| 2021/0128776 | A1* | 5/2021 | Chien | H01T 23/00 |

FOREIGN PATENT DOCUMENTS

| | | | | | |
|---|---|---|---|---|---|
| CN | 103994533 | A | | 8/2014 | |
| CN | 106422066 | A | | 2/2017 | |
| CN | 206896619 | U | | 1/2018 | |
| CN | 107786922 | A | | 3/2018 | |
| CN | 208418993 | U | | 1/2019 | |
| CN | 209517439 | U | * | 10/2019 | A61L 9/16 |
| CN | 209517439 | U | | 10/2019 | |
| CN | 209848605 | U | | 12/2019 | |
| CN | 110676695 | A | | 1/2020 | |
| CN | 110743258 | A | | 2/2020 | |
| CN | 210075525 | U | | 2/2020 | |
| CN | 111298313 | A | | 6/2020 | |
| CN | 210668991 | U | | 6/2020 | |
| JP | 3220657 | U | * | 3/2019 | A61L 9/16 |
| JP | 3225305 | U | | 2/2020 | |
| JP | 2020-57929 | A | | 4/2020 | |
| JP | 2021-18947 | A | | 2/2021 | |
| JP | 2021018947 | A | * | 2/2021 | A61L 9/22 |

* cited by examiner

WEARABLE AIR PURIFIER

CROSS REFERENCE TO RELATED APPLICATIONS

This application claims the benefit of U.S. Provisional Application No. 63/058,497, filed on Jul. 30, 2020, and the entire contents of this application are hereby incorporated by reference.

BACKGROUND OF THE INVENTION

1. Field of the Invention

The present invention relates to a wearable device, and more particularly, to a wearable air purifier.

2. Description of the Prior Art

With development of the society and advancement of the technology, there are more and more consumer goods available in the market for bringing convenience in people's life. An air purifier is one of the consumer goods to remove airborne biological particles, like germs, pollutants, allergens and molds, for purifying air. However, the conventional air purifier is bulky and usually used indoors only as a non-portable device. When people go outside, poor air quality may cause allergy symptoms, such as sneezing or coughing. Therefore, there is a need to provide a portable air purifier.

SUMMARY OF THE INVENTION

It is an objective of the present invention to provide a wearable air purifier for solving the aforementioned problem.

In order to achieve the aforementioned objective, the present invention discloses a wearable air purifier. The wearable air purifier includes at least one wearable component, a control unit, at least one speaker assembly and at least one negative ion generating component. The control unit is disposed inside the at least one wearable component. The at least one speaker assembly is disposed on the at least one wearable component and electrically connected to the control unit. The at least one negative ion generating component is disposed on the at least one wearable component and electrically connected to the control unit. The control unit provides high-voltage currents to the at least one negative ion generating component to enable the at least one negative ion generating component to emit negative ions by corona discharging, and the control unit further provides audio signals to the at least one speaker assembly to activate the at least one speaker assembly to generate sound.

According to an embodiment of the present invention, the at least one negative ion generating component includes a first negative ion generating component and a second negative ion generating component disposed on the at least one wearable component, and the at least one speaker assembly includes a first speaker assembly and a second speaker assembly disposed on the at least one wearable component.

According to an embodiment of the present invention, a first opening and a second opening are formed on the at least one wearable component. The first negative generating component is partially exposed via the first opening, and the second negative ion generating component is partially exposed via the second opening.

According to an embodiment of the present invention, the first opening and the second opening are formed on two distal ends of the at least one wearable component.

According to an embodiment of the present invention, at least one chamber is formed inside the at least one wearable component, and the control unit includes at least one circuit board assembly disposed inside the at least one chamber.

According to an embodiment of the present invention, the at least one circuit board assembly includes a plurality of circuit board assemblies electrically connected to each other in a wired manner or in a wireless manner.

According to an embodiment of the present invention, the at least one wearable component includes a first wearable component and a second wearable component separated from the first wearable component. The first negative ion generating component and the first speaker assembly are disposed on the first wearable component. The second negative ion generating component and the second speaker assembly are disposed on the second wearable component.

According to an embodiment of the present invention, the control unit includes a first circuit board assembly disposed on the first wearable component and a second circuit board assembly disposed on the second wearable component and electrically connected to the first circuit board assembly in a wired manner or a wireless manner.

According to an embodiment of the present invention, a first chamber is formed inside the first wearable component. A second chamber is formed inside the second wearable component. The first circuit board assembly is disposed inside the first chamber, and the second circuit board assembly is disposed inside the second chamber.

According to an embodiment of the present invention, a first opening is formed on the first wearable component. A second opening is formed on the second wearable component. The first negative generating component is partially exposed via the first opening, and the second negative ion generating component is partially exposed via the second opening.

According to an embodiment of the present invention, at least one opening is formed on the at least one wearable component, and the at least one negative ion generating component is partially exposed via the at least one opening.

According to an embodiment of the present invention, at least one chamber is formed inside the at least one wearable component, and the control unit includes at least one circuit board assembly disposed inside the at least one chamber.

According to an embodiment of the present invention, the at least one speaker assembly includes at least one of a coil, a magnet and a diaphragm.

According to an embodiment of the present invention, the at least one wearable component is a neck-worn component, an ear-worn component, an in-ear component or a head-worn component.

According to an embodiment of the present invention, the at least one speaker assembly is an over-ear speaker assembly, an earbud speaker assembly, an in-ear speaker assembly or a bone conduction speaker assembly.

According to an embodiment of the present invention, the at least one negative ion generating component includes a fiber bundle, at least one microtube, at least one microneedle or a combination of a baseplate and a plurality of tube structures or wire structures in nano dimension or micro dimension.

According to an embodiment of the present invention, the at least one negative ion generating component is made of electrically conductive material.

According to an embodiment of the present invention, the wearable air purifier further includes at least one holding component for fixing a position and an orientation of the at least one negative ion generating component.

According to an embodiment of the present invention, at least one chamber is formed inside the at least one wearable component. At least one opening is formed on the at least one wearable component and communicated with the at least one chamber. The at least one holding component is disposed inside the at least one chamber and located at a position corresponding to the at least one opening. A through hole is formed on the at least one holding component, and the at least one negative ion generating component passes through the through hole in a tight fitting manner and is exposed via the at least one opening.

According to an embodiment of the present invention, the at least one holding component is made of electrically non-conductive material or electrical resistance material.

In summary, in the present invention, the control unit provides high-voltage currents to the negative ion generating component to enable the negative ion generating component to emit negative ions by corona discharging, and the control unit further provides audio signals to the speaker assembly to activate the speaker assembly to generate sound. Furthermore, the wearable air purifier has better portability because the wearable air purifier is light, compact and small. Therefore, the present invention is versatile.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive. Also, the term "connect" is intended to mean either an indirect or direct electrical/mechanical connection. Thus, if a first device is connected to a second device, that connection may be through a direct electrical/mechanical connection, or through an indirect electrical/mechanical connection via other devices and connections.

Figure 1:
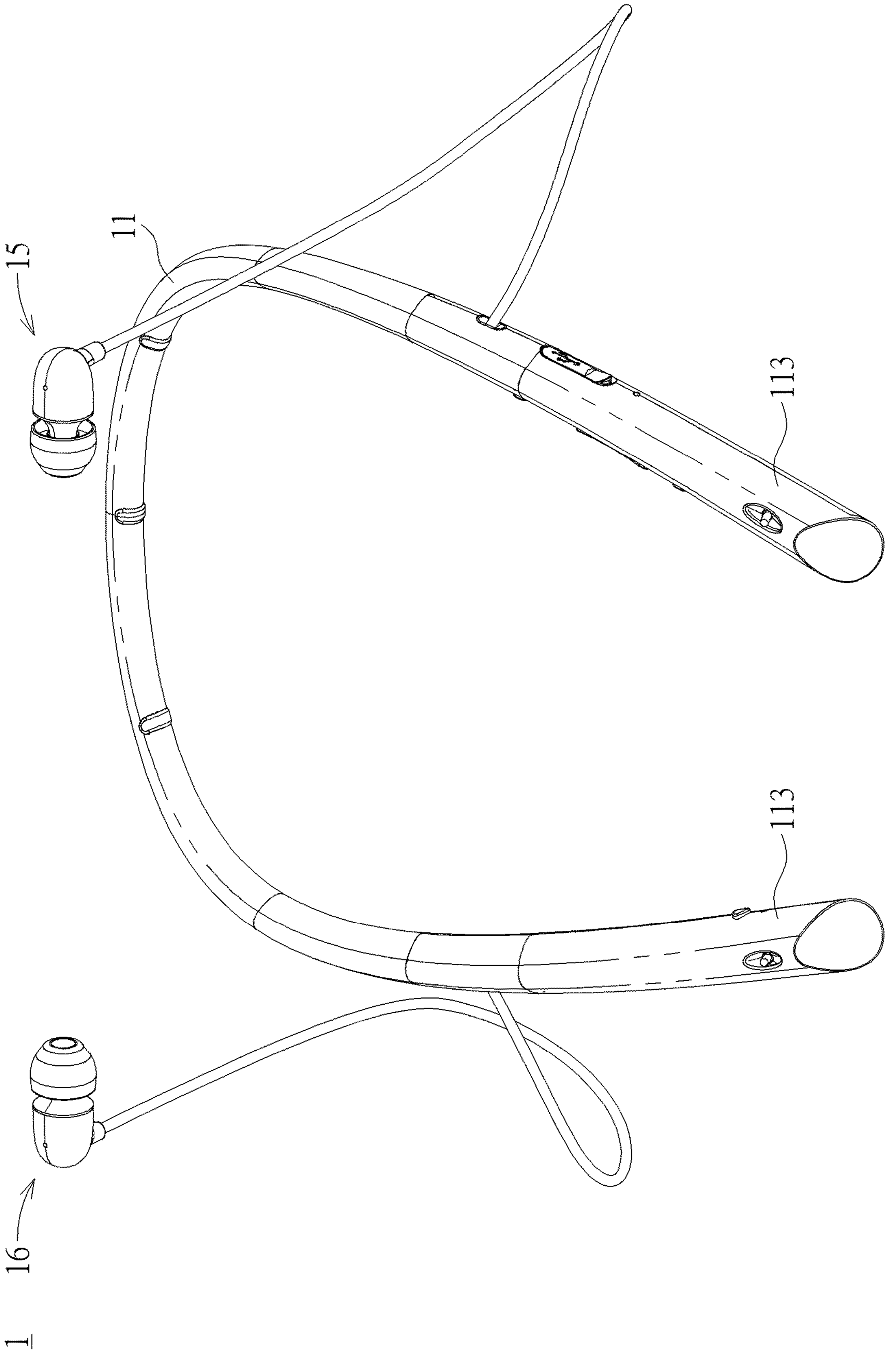
FIG. 1 is a diagram of a wearable air purifier according to a first embodiment of the present invention.
Figure 2:
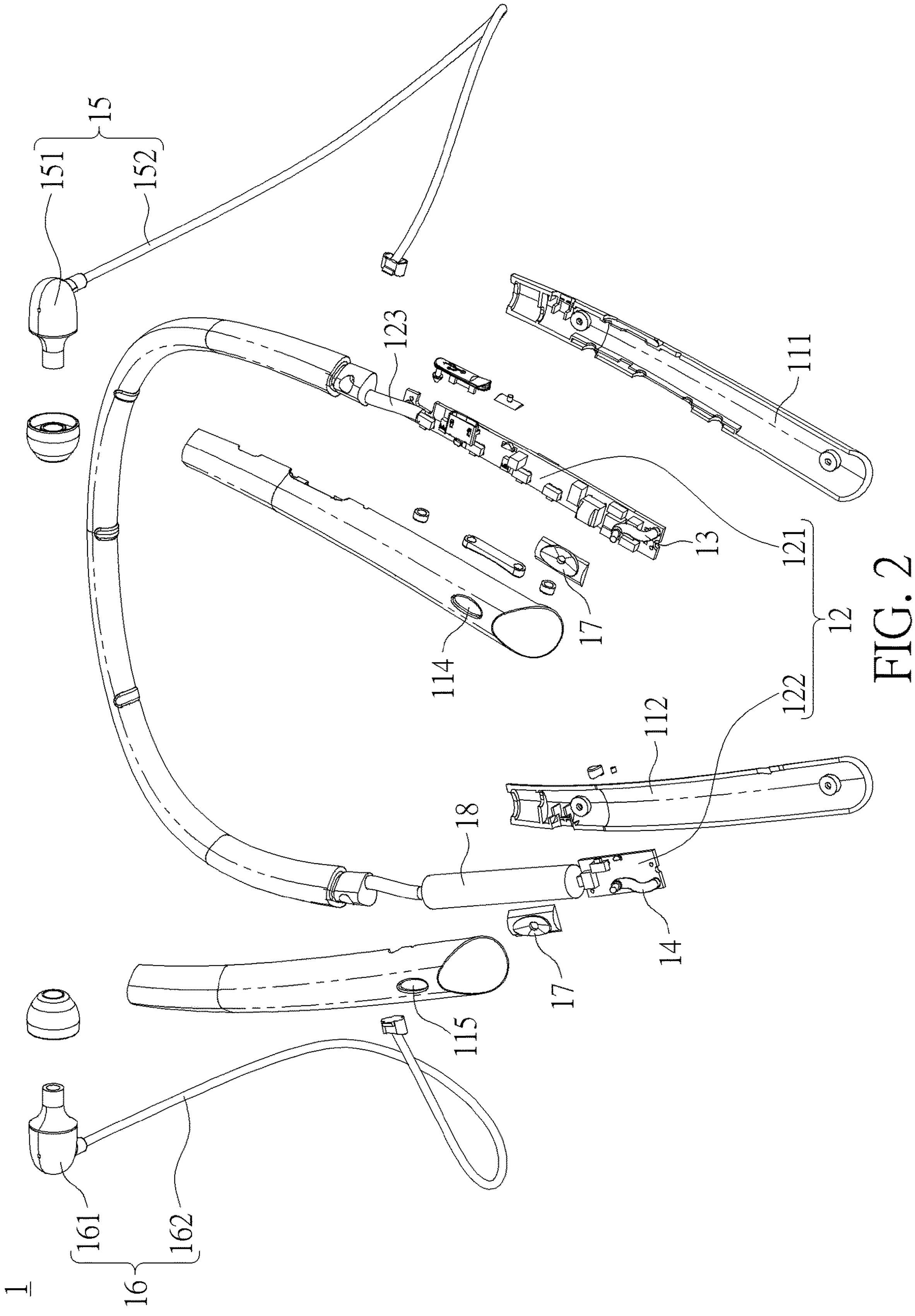
FIG. 2 is an exploded diagram of the wearable air purifier according to the first embodiment of the present invention.

Please refer to FIG. 1 and FIG. 2. FIG. 1 is a diagram of a wearable air purifier 1 according to a first embodiment of the present invention. FIG. 2 is an exploded diagram of the wearable air purifier 1 according to the first embodiment of the present invention. As shown in FIG. 1 and FIG. 2, the wearable air purifier 1 includes a wearable component 11, a control unit 12, a first negative ion generating component 13, a second negative ion generating component 14, a first speaker assembly 15 and a second speaker assembly 16.

In this embodiment, the wearable component 11 is formed in a U-shaped structure. The control unit 12 includes a first circuit board assembly 121 and a second circuit board assembly 122. A first chamber 111 and a second chamber 112 are respectively formed inside two distal ends 113 of the wearable component 11, and a first opening 114 and a second opening 115 are respectively formed on the two distal ends 113 of the wearable component 11 and respectively communicated with the first chamber 111 and the second chamber 112. The first circuit board assembly 121 and the second circuit board assembly 122 are respectively disposed inside the first chamber 111 and the second chamber 112. The first negative ion generating component 13 and the second negative ion generating component 14 are respectively electrically connected to the first circuit board assembly 121 and the second circuit board assembly 122 and respectively passes through the first opening 114 and the second opening 115. As such, the first negative ion generating component 13 and the second negative ion generating component 14 are partially exposed via the first opening 114 and the second opening 115 respectively, so as to emit negative ions by corona discharging toward a wearer's nose. The first speaker assembly 15 and the second speaker assembly 16 are disposed on the wearable component 11 in a detachable manner and electrically connected to the first circuit board assembly 121. However, the present invention is not limited to this embodiment. For example, in another implementation, the first speaker assembly and the second speaker assembly can disposed on the wearable component in a fixing manner and electrically connected to the first circuit board assembly and the second circuit board assembly respectively. It also should be noticed that, in another implementation, the first negative ion generating component and/or the second negative ion generating component might just exposed via their respective openings but not pass through or protrude out of their respective openings.

Preferably, in this embodiment, the first circuit board assembly 121 and the second circuit board assembly 122 can be electrically connected to each other by at least one electrically connecting component 123, such as a wire or a cable, which can pass through a middle portion of the wearable component 11. However, the present invention is not limited to this embodiment. In another implementation, the first circuit board assembly and the second circuit board assembly can be electrically connected to each other wirelessly or not electrically connected to each other, and there can be no cable or wire passing through the wearable component. In another implementation, the wearable air purifier also can include one negative ion generating component and one speaker assembly at the same side or at two different sides, and the wearable component can be provided with one opening and one chamber at a side corresponding to the negative ion generating component.

Specifically, in this embodiment, the first circuit board assembly 121 can be a circuit board assembly which has a booster circuit for generating high-voltage currents and an audio circuit for generating audio signals. Preferably, the high-voltage current can has a voltage of 1~10 kV and a current of 0.1 μA~1 mA. More preferably, the high-voltage current can has a voltage of 1~3.5 kV and a current of 1~4 μA. However, the present invention is not limited thereto. It depends on practical demands. The first circuit board assembly 121 can provide high-voltage currents to the first negative ion generating component 13 and the second circuit board assembly 122, and the second circuit board assembly 122 can provide the high-voltage currents from the first circuit board assembly 121 to the second negative ion generating component 14, so as to enable the first negative ion generating component 13 and the second negative ion generating component 14 to emit negative ions by corona discharging. Furthermore, the first circuit board assembly 121 can provide audio signals to the first speaker assembly 15 and the second speaker assembly 16, so as to activate both of the first speaker assembly 15 and the second speaker assembly 16 to generating the sound.

Figure 3:
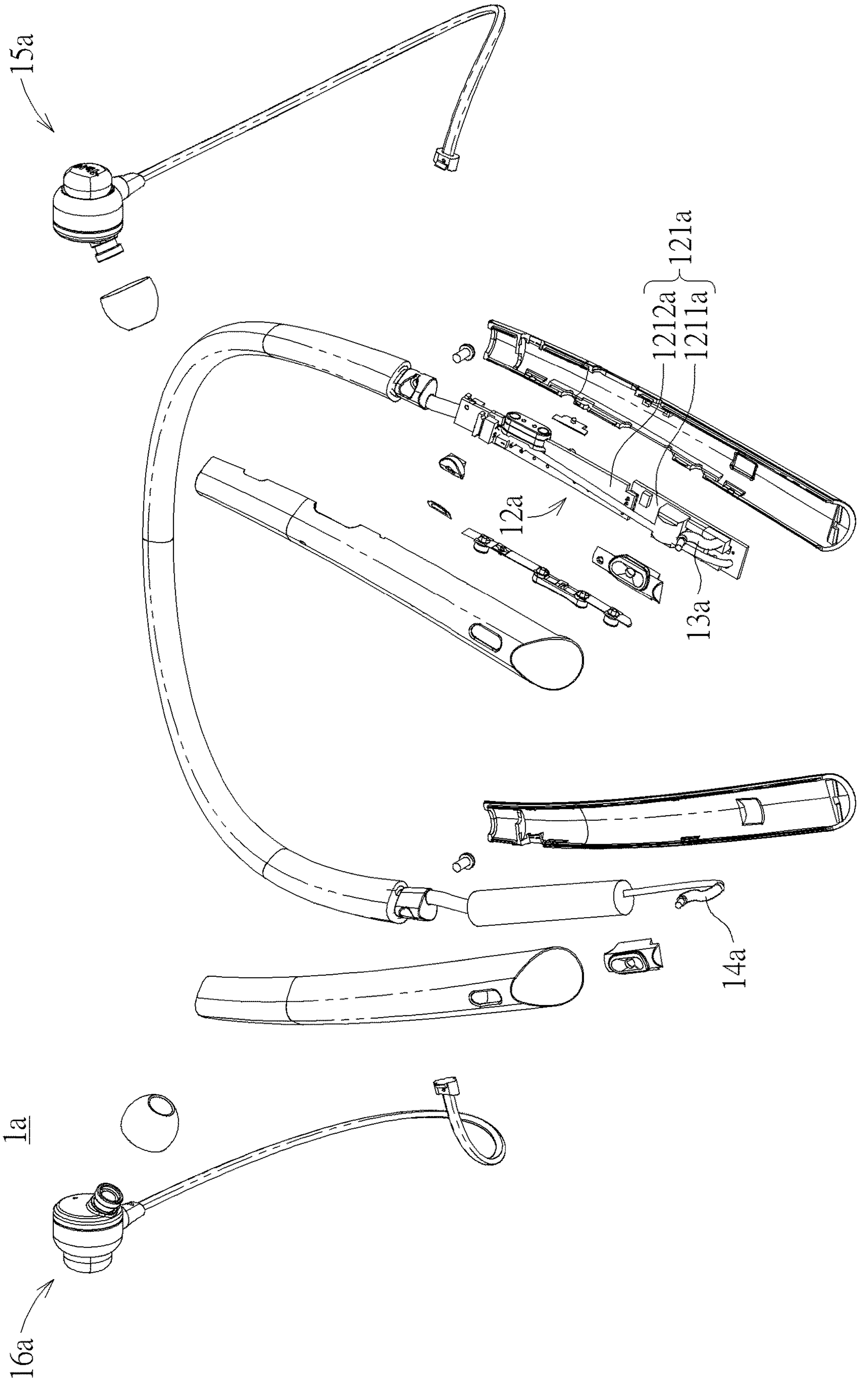
FIG. 3 is an exploded diagram of a wearable air purifier according to a second embodiment.

However, the present invention is not limited to this embodiment. For example, please refer to FIG. 3. FIG. 3 is an exploded diagram of a wearable air purifier 1*a* according to a second embodiment of the present invention. As shown in FIG. 3, in this embodiment, a control unit 12*a* includes a first circuit board assembly 121*a* only, and the first circuit board assembly 121*a* includes two circuit boards 1211*a*, 1212*a* electrically connected to each other. The first circuit board assembly 121*a* can be electrically connected to a first negative ion generating component 13*a*, a second negative ion generating component 14*a*, a first speaker assembly 15*a* and a second speaker assembly 16*a* and configured to directly provide the high-voltage currents to both of the first negative ion generating component 13*a* and the second negative ion generating component 14*a* and directly transmit the audio signals to both of the first speaker assembly 15*a* and the second speaker assembly 16*a*. It should be noticed that, in another implementation, there can be only one circuit board electrically connected to the first negative ion generating component, the second negative ion generating component, the first speaker assembly and the second speaker assembly.

Figure 6:
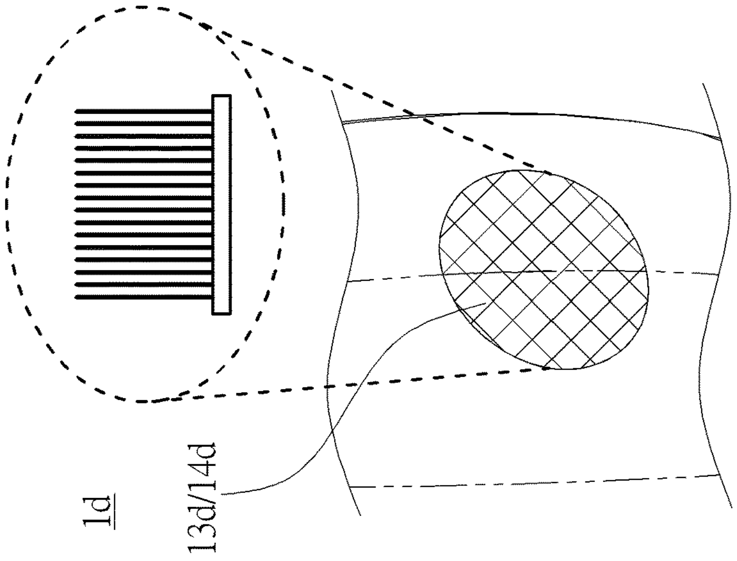
FIG. 4 to FIG. 6 are partial diagrams of wearable air purifiers according to different embodiments of the present invention.
Figure 5:
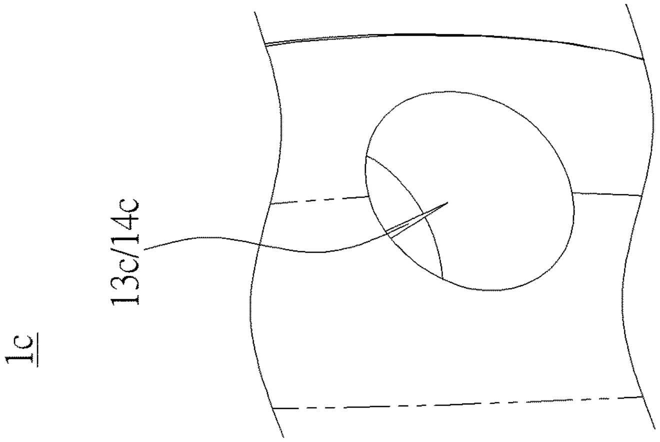
Figure 4:
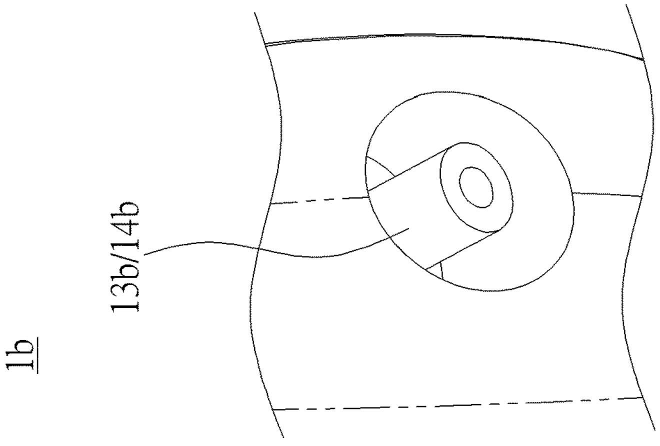

Furthermore, in this embodiment, as shown in FIG. 2, each of the first negative ion generating component 13 and the second negative ion generating component 14 can include a fiber bundle made of electrically conductive material, e.g., carbon. However, the present invention is not limited to thereto. The first negative ion generating component and/or the second negative ion generating component can be a flexible or inflexible structure. For example, please refer to FIG. 4 to FIG. 6. FIG. 4 to FIG. 6 are partial diagrams of wearable air purifiers 1*b*-1*d* according to different embodiments of the present invention. As shown in FIG. 4, in this embodiment, a first negative ion generating component 13*b* or a second negative ion generating component 14*b* can include a microtube made of electrically conductive material. In another implementation, there can be two or more microtubes. As shown in FIG. 5, in this embodiment, a first negative ion generating component 13*c* or a second negative ion generating component 14*c* can include a microneedle made of electrically conductive material. In another implementation, there can be two or more microneedles. As shown in FIG. 6, in this embodiment, a first negative ion generating component 13*d* or a second negative ion generating component 14*d* can include a base plate, which can be made of, for example, silicon or glass or carbon fiber. The base plate, meanwhile, can be coated with an electrically conductive layer formed by metal oxides, or not. Multiple tube structures or wire structures in nano dimension or micro dimension made of electrically conductive material, can be formed on the base plate.

Besides, as shown in FIG. 2, the wearable air purifier 1 further includes two holding components 17. It should be noticed that, in another implementation, the wearable air purifier might not have any holding component. The two holding components 17 are respectively disposed inside the first chamber 111 and the second chamber 112 and respectively located at positions corresponding to the first opening 114 and the second opening 115. A through hole is formed on each of the holding components 17. The first negative ion generating component 13 and the second negative ion generating component 14 respectively pass through the through holes in a tight fitting manner. The two holding components 17 are for fixing positions and orientations of the first negative ion generating component 13 and the second negative ion generating component 14 and further for preventing outside substance from entering into the first chamber 111 and the second chamber 112 via the first opening 114 and the second opening 115 to avoid damage to the components inside the first chamber 111 and the second chamber 112. Preferably, each of the holding components 17 can be made of electrically non-conductive material or electrical resistance material, e.g., rubber. Understandably, in another implementation, there can be no holding component.

In addition, the wearable air purifier 1 further includes a battery 18. The battery 18 is disposed inside the second chamber 112 and connected to the first circuit board assembly 121 which is electrically connected to the second circuit board assembly 122 to provide electrical power for the first circuit board assembly 121 and the second circuit board assembly 122. However, in another implementation, the battery can be disposed inside the first chamber together with the first circuit board assembly. Alternatively, in another implementation, there can be two batteries respectively disposed in the first chamber and the second chamber and respectively electrically connected to the first circuit board assembly and the second circuit board assembly.

Furthermore, the first speaker assembly 15 includes a first speaker unit (not shown), a first speaker housing 151 and a first speaker cable 152. The second speaker assembly 16 includes a second speaker unit (not shown), a second speaker housing 161 and a second speaker cable 162. The first speaker housing 151 and the second speaker housing 161 are separated away from the wearable component 11. The first speaker unit and the second speaker unit are respectively disposed inside the first speaker housing 151 and the second speaker housing 161, and each of the first speaker unit and the second speaker unit can include at least one of a coil, a magnet and a diaphragm for generating sound. The first speaker cable 152 is disposed between the first speaker housing 151 and the wearable component 11 and electrically connected between the first speaker unit and the first circuit board assembly 121 for signal and electricity transmission. The second speaker cable 162 is disposed between the second speaker housing 161 and the wearable component 11 and electrically connected between the second speaker unit and the first circuit board assembly 121 for signal and electricity transmission. Preferably, the wearable component 11 can be a neck-worn component, such as a necklace. Preferably, in this embodiment, each of the first speaker assembly 15 and the second speaker assembly 16 can be an earbud speaker assembly or an in-ear speaker assembly.

Figure 7:
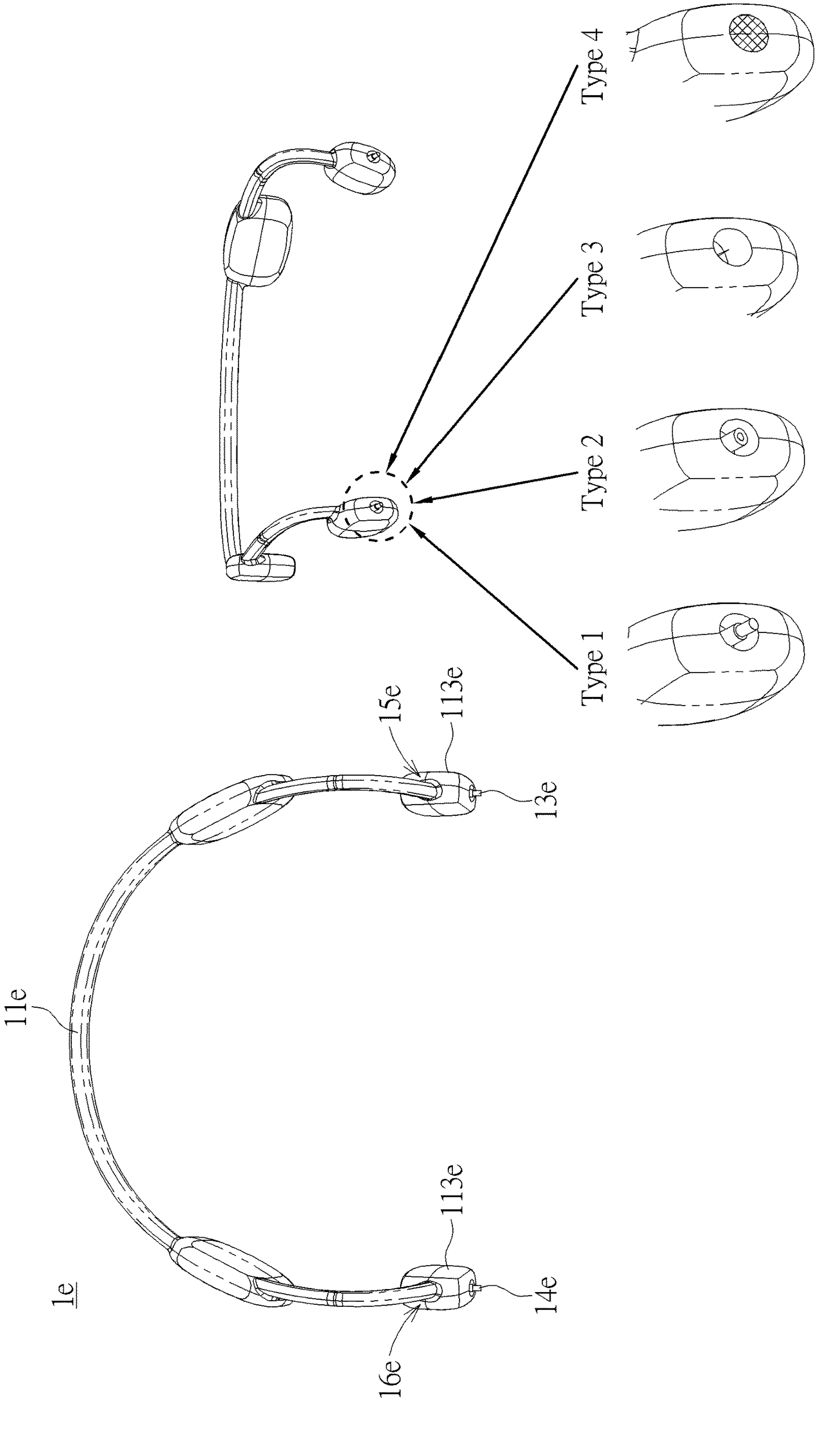
FIG. 7 is a diagram of a wearable air purifier according to a third embodiment of the present invention.

However, the present invention is not limited to the aforementioned embodiment. For example, please refer to FIG. 7. FIG. 7 is a diagram of a wearable air purifier 1*e* according to a third embodiment of the present invention. As shown in FIG. 7, different from the first embodiment, a first speaker assembly 15*e* and a second speaker assembly 16*e* are integrally formed with a wearable component 11*e*. Specifically, each of the first speaker assembly 15*e* and the second speaker assembly 16*e* includes a speaker unit and a speaker cable, both which are not shown in the figure. Each of the speaker units of the first speaker assembly 15*e* and the second speaker assembly 16*e* is disposed on a corresponding distal end 113*e* of the wearable component 11*e*, and can include a bone conduction component. Each of the speaker cables of the first speaker assembly 15*e* and the second speaker assembly 16*e* is arranged inside the wearable component 11*e* and electrically connected between the corresponding speaker unit and a corresponding one of the first circuit board assembly and the second circuit board assembly, both which are not shown in the figure. Each of the first speaker assembly 15*e* and the second speaker assembly 16*e* does not include any speaker housing separated from the wearable component 11*e*. Furthermore, in this embodiment, the wearable component 11*e* can be an ear-worn component, such as an ear hanger. A first negative ion generating component 13*e* and a second negative ion generating component 14*e* are respectively located on two distal ends of the ear-worn component and for emitting negative ions by corona discharging toward the wearer's nose. Preferably, in this embodiment, each of the first speaker assembly 15*e* and the second speaker assembly 16*e* can be a bone conduction speaker assembly. Furthermore, similar to the first embodiment, the first negative ion generating component 13*e* or the second negative ion generating component 14*e* also can include a fiber bundle shown in Type 1, a microtube shown in Type 2, a microneedle shown in Type 3, or a combination of a baseplate and a plurality of tube structures or wire structures in nano dimension or micro dimension shown in Type 4. In another implementation, each of the first speaker assembly and the second speaker assembly also can be an earbud speaker assembly instead of a bone conduction speaker assembly, and in the case where each of the first speaker assembly and the second speaker assembly is the earbud speaker, a speaker housing of the earbud speaker might be or might not be separated from the wearable component. It depends on practical demands. Furthermore, in another implementation, the speaker cable can be omitted, i.e., each of the speaker units of the first speaker assembly and the second speaker assembly is electrically connected to a corresponding one of the first circuit board assembly and the second circuit board assembly wirelessly.

Figure 8:
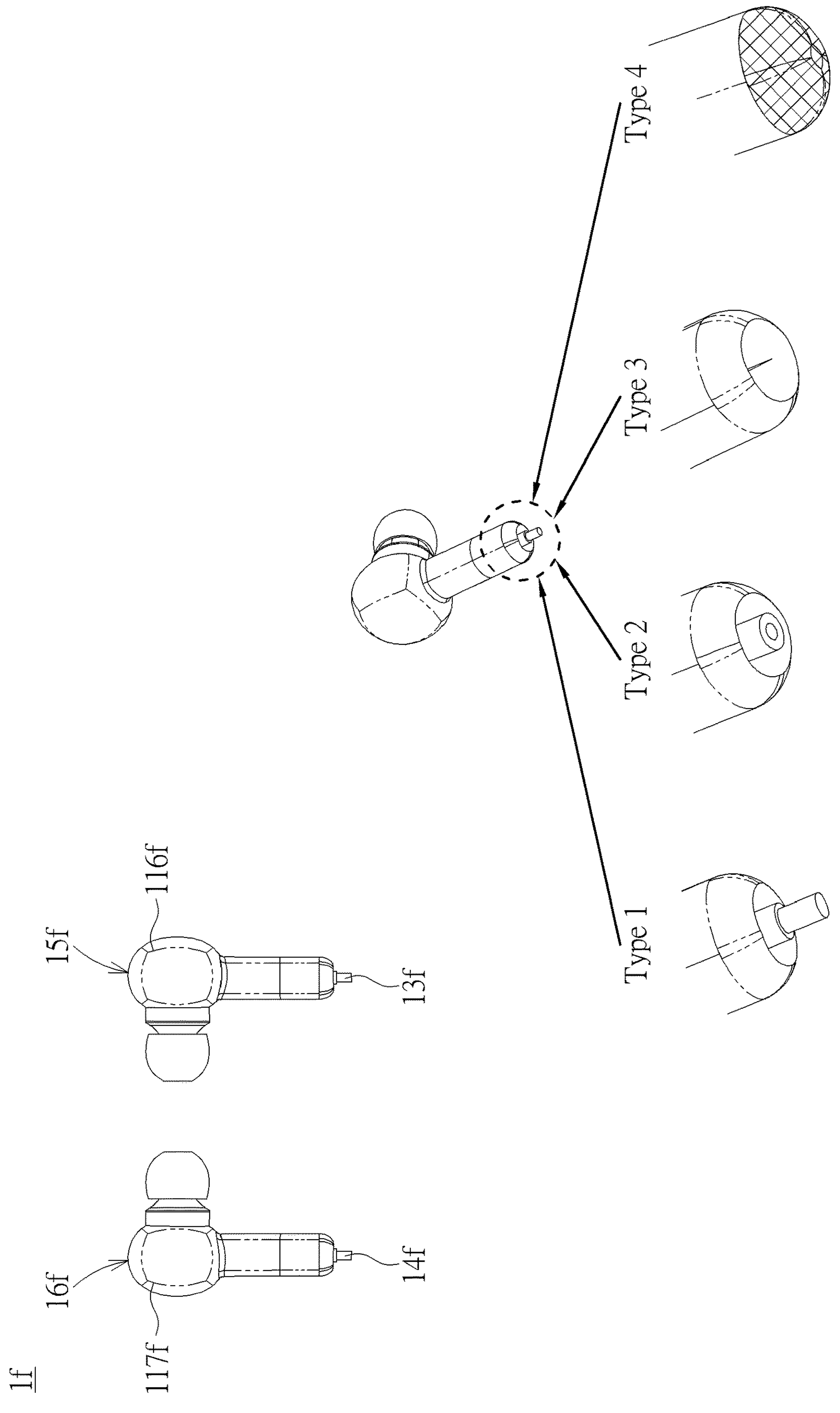
FIG. 8 is a diagram of a wearable air purifier according to a fourth embodiment of the present invention.

Besides, please refer to FIG. 8. FIG. 8 is a diagram of a wearable air purifier if according to a fourth embodiment of the present invention. As shown in FIG. 8, different from the aforementioned embodiments, the wearable air purifier if includes a first wearable component 116*f* and a second wearable component 117*f*. A first speaker assembly 15*f* and a second speaker assembly 16*f* are respectively integrally formed with the first wearable component 116*f* and the second wearable component 117*f*. In this embodiment, since the first wearable component 116*f* and the second wearable component 117*f* are separated from each other, the wearable air purifier if can include two batteries, both which are not shown in the figure, respectively disposed in the first wearable component 116*f* and the second wearable component 117*f*. The first circuit board assembly and the second circuit board assembly, both which are not shown in the figure, are respectively disposed in the first wearable component 116*f* and the second wearable component 117*f*. Furthermore, the first circuit board assembly and the second circuit board assembly can work dependently or independently. Specifically, each of the first speaker assembly 15*f* and the second speaker assembly 16*f* includes a speaker unit, which is not shown in the figure and can include at least one of a coil, a magnet and a diaphragm, and can be electrically connected to a corresponding one of the first circuit board assembly and the second circuit board assembly. The first speaker assembly 15*f* does not include any speaker housing separated from the first wearable component 116*f*, and the second speaker assembly 16*f* does not include any speaker housing separated from the second wearable component 117*f*. Furthermore, in this embodiment, each of the first wearable component 116*f* and the second wearable component 117*f* can be an in-ear component, and each of a first negative ion generating component 13*f* and a second negative ion generating component 14*f* is located on a distal end of a corresponding one of the first wearable component 116*f* and the second wearable component 117*f* and for emitting negative ions by corona discharging toward the wearer's nose. Preferably, in this embodiment, each of the first speaker assembly 15*f* and the second speaker assembly 16*f* can be an earbud speaker assembly or an in-ear speaker assembly. Furthermore, similar to the first embodiment, the first negative ion generating component 13*f* or the second negative ion generating component 14*f* also can be a fiber bundle shown in Type 1, a microtube shown in Type 2, a microneedle shown in Type 3, or a combination of a baseplate and a plurality of nanotube shown in Type 4. Besides, the first speaker assembly 15*f* and the second speaker assembly 16*f* can work independently from each other, and the first negative ion generating component 13*f* together with the first circuit board assembly can work independently from the second negative ion generating component 14*f* together with the second circuit board assembly, which allows the wearer to use the wearable component, the speaker assembly, the circuit board assembly and the negative ion generating component at one side only.

Figure 9:
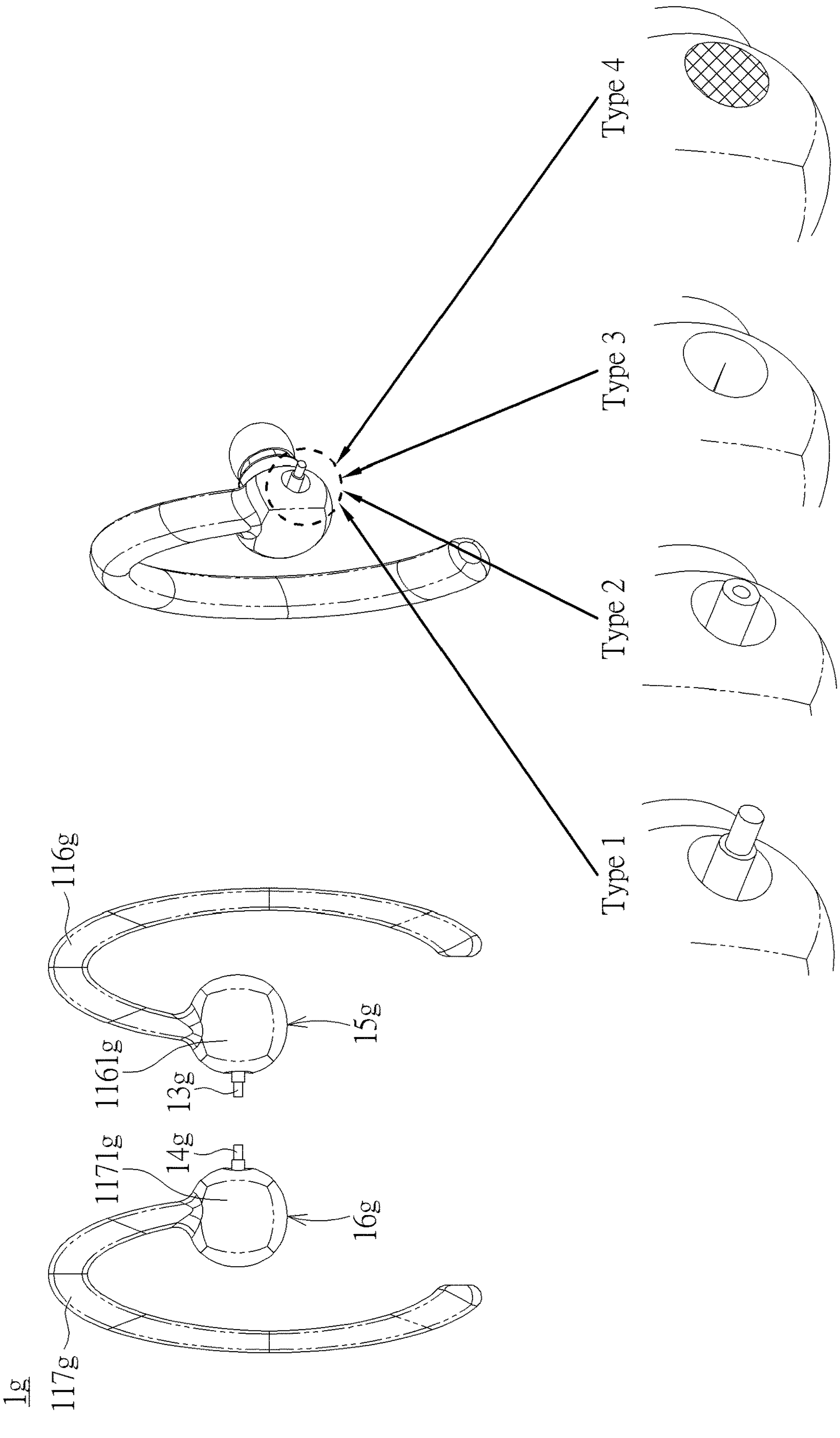
FIG. 9 is a diagram of a wearable air purifier according to a fifth embodiment of the present invention.

In addition, please refer to FIG. 9. FIG. 9 is a diagram of a wearable air purifier 1*g* according to a fifth embodiment of the present invention. As shown in FIG. 9, the wearable air purifier 1*g* of this embodiment is similar to the wearable air purifier if of the fourth embodiment. However, in this embodiment, each of a first wearable component 116*g* and a second wearable component 117*g* can be an ear worn component, such as an ear hanger, and a first negative ion generating component 13*g* and a second negative ion generating component 14*g* are respectively located at proximal ends 1161*g*, 1171*g* of the first wearable component 116*g* and the second wearable component 117*g*, so as to emit negative ions by corona discharging toward the wearer's nose. Besides, a first speaker assembly 15*g* and a second speaker assembly 16*g* can work independently from each other, and the first negative ion generating component 13*g* together with the first circuit board assembly can work independently from the second negative ion generating component 14*g* together with the second circuit board assembly, which allows the wearer to use the wearable component, the speaker assembly, the circuit board assembly and the negative ion generating component at one side only.

Figure 10:
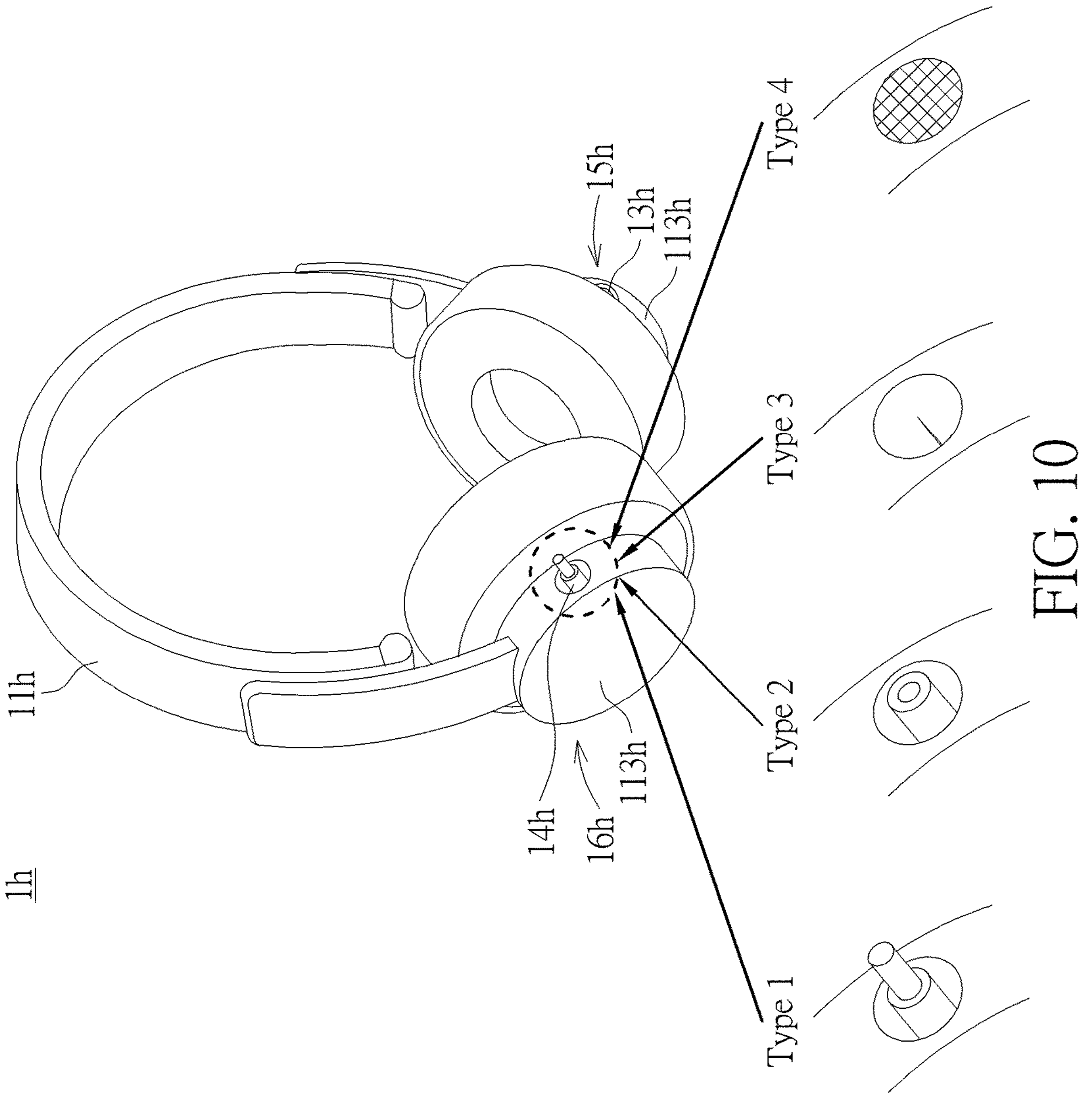
FIG. 10 is a diagram of a wearable air purifier according to a sixth embodiment of the present invention.

Besides, please refer to FIG. 10. FIG. 10 is a diagram of a wearable air purifier 1*h* according to a sixth embodiment of the present invention. As shown in FIG. 10, a first speaker assembly 15*h* and a second speaker assembly 16*h* are integrally formed with a wearable component 11*h*. Specifically, each of the first speaker assembly 15*h* and the second speaker assembly 16*h* includes a speaker unit and a cable, both which are not shown in the figure. Each of the speaker units of the first speaker assembly 15*h* and the second speaker assembly 16*h* is disposed on a corresponding one of distal ends 113*h* of the wearable component 11*h*. Each of the speaker cables of the first speaker assembly 15*h* and the second speaker assembly 16*h* is arranged inside the wearable component 11*h* and electrically connected to the corresponding speaker unit and a corresponding one of a first circuit board assembly and a second circuit board assembly, both which are not shown in the figure. Each of the first speaker assembly 15*h* and the second speaker assembly 16*h* does not include any speaker housing separated from the wearable component 11*h*. In this embodiment, the wearable component 11*h* can be a head-worn component, such as a headband, and a first negative ion generating component 13*h* and a second negative ion generating component 14*h* are respectively located on two distal ends of the head-worn component and for emitting negative ions by corona discharging toward the wearer's nose. Preferably, in this embodiment, each of the first speaker assembly 15*h* and the second speaker assembly 16*h* can be an over-ear speaker assembly, and there is no cable or wire passing through the wearable component 11*h* for electrically connecting the first circuit board assembly and the second circuit board assembly. Furthermore, similar to the first embodiment, the first negative ion generating component 13*h* or the second negative ion generating component 14*h* also can include a fiber bundle shown in Type 1, a microtube shown in Type 2, a microneedle shown in Type 3, or a combination of a baseplate and a plurality of tube structures or wire structures in nano dimension or micro dimension shown in Type 4. Besides, in another implementation, the speaker cable can be omitted, i.e., each of the speaker units of the first speaker assembly and the second speaker assembly is electrically connected to a corresponding one of the first circuit board assembly and the second circuit board assembly wirelessly.

Figure 11:
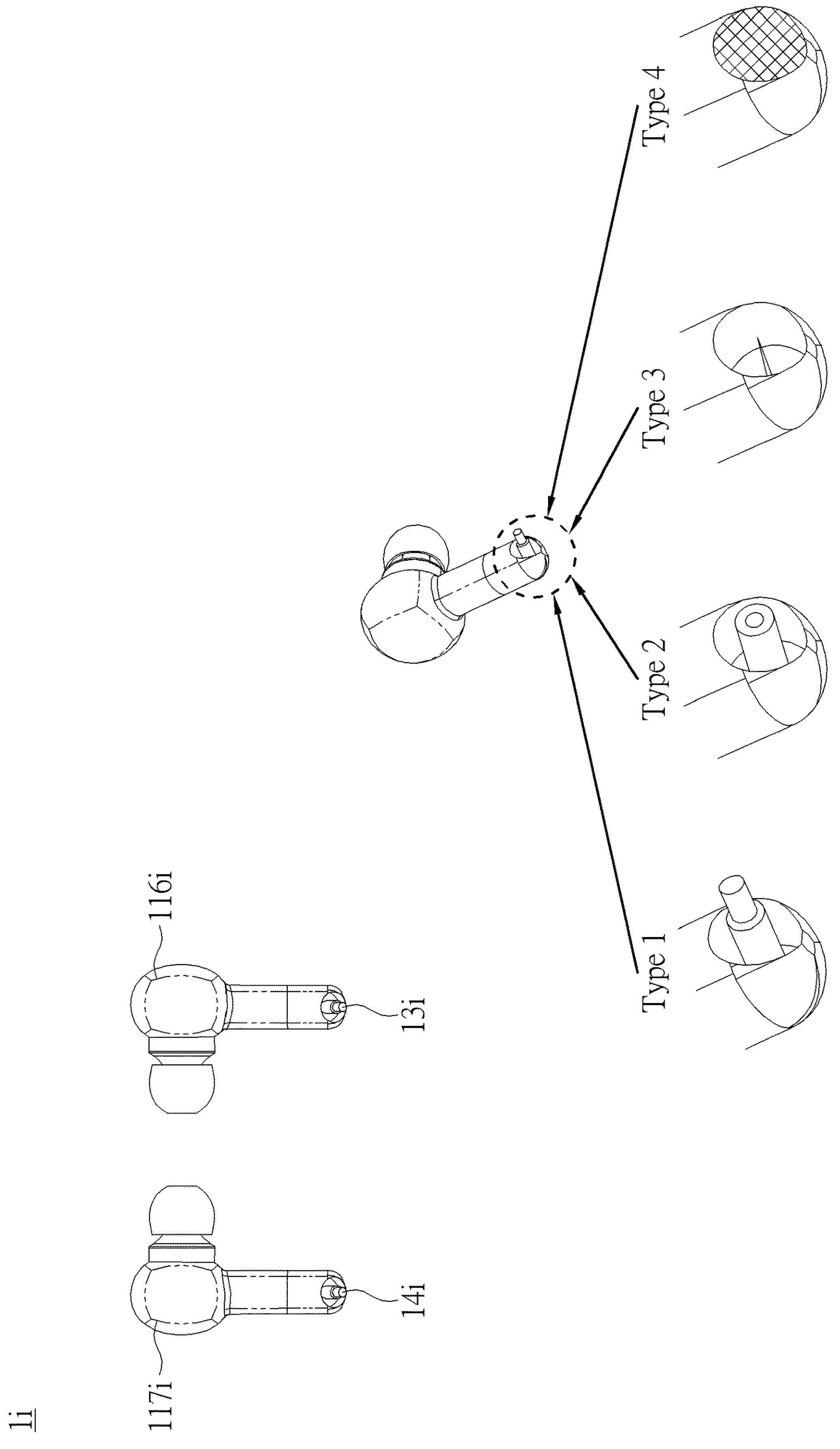
FIG. 11 is a diagram of a wearable air purifier according to a seventh embodiment of the present invention.

Please refer to FIG. 11. FIG. 11 is a diagram of a wearable air purifier 1*i* according to a seventh embodiment of the present invention. As shown in FIG. 11, the wearable air purifier 1*i* of this embodiment is similar to the wearable air purifier if of the fourth embodiment. However, in the fourth embodiment, the first negative ion generating component 13*f* and the second negative ion generating component 14*f* are located at a central portion of a distal end of the first wearable component 116*f* and a central portion of a distal end of the second wearable component 117*f* respectively, and an extending direction of the first negative ion generating component 13*f* and an extending direction of the second negative ion generating component 14*f* are parallel to a longitudinal direction of the first wearable component 116*f* and a longitudinal direction of the second wearable component 117*f* respectively. On the other hand, in this embodiment, a first negative ion generating component 13*i* and the second negative ion generating component 14*f* are located at a lateral portion of a distal end of a first wearable component 116*i* and a lateral portion of a distal end of a second wearable component 117*i* respectively, and an extending direction of the first negative ion generating component 13*i* and an extending direction of the second negative ion generating component 14*i* are inclined relative to a longitudinal direction of the first wearable component 116*f* and a longitudinal direction of the second wearable component 117*f* respectively. In other words, the positions and the orientations of the first the first negative ion generating component and/or the second negative ion generating component depend on practical appearance designs.

In summary, in the present invention, the control unit provides high-voltage currents to the negative ion generating component to enable the negative ion generating component to emit negative ions by corona discharging, and the control unit further provides audio signals to the speaker assembly to activate the speaker assembly to generate sound. Furthermore, the wearable air purifier has better portability because the wearable air purifier is light, compact and small. Therefore, the present invention is versatile.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wearable air purifier comprising:

at least one wearable component, at least one chamber being formed inside the at least one wearable component, and at least one opening being formed on the at least one wearable component and communicated with the at least one chamber;

a control unit disposed inside the at least one wearable component;

at least one speaker assembly disposed on the at least one wearable component and electrically connected to the control unit;

at least one negative ion generating component disposed on the at least one wearable component and electrically connected to the control unit; and at least one holding component disposed inside the at least one chamber and located at a position corresponding to the at least one opening, a through hole being formed on the at least one holding component, the at least one negative ion generating component passing through the through hole in a tight fitting manner and being exposed via the at least one opening, the at least one holding component being for fixing a position and an orientation of the at least one negative ion generating component and further for preventing outside substance from entering into the at least one chamber via the at least one opening;

wherein the control unit provides high-voltage currents to the at least one negative ion generating component to enable the at least one negative ion generating component to emit negative ions by corona discharging, and the control unit further provides audio signals to the at least one speaker assembly to activate the at least one speaker assembly to generate sound.

2. The wearable air purifier of claim 1, wherein the at least one negative ion generating component comprises a first negative ion generating component and a second negative ion generating component disposed on the at least one wearable component, and the at least one speaker assembly comprises a first speaker assembly and a second speaker assembly disposed on the at least one wearable component.

3. The wearable air purifier of claim 2, wherein the at least one opening comprises a first opening and a second opening, the first opening and the second opening are formed on the at least one wearable component, the first negative generating component is partially exposed via the first opening, and the second negative ion generating component is partially exposed via the second opening.

4. The wearable air purifier of claim 3, wherein the first opening and the second opening are formed on two distal ends of the at least one wearable component.

5. The wearable air purifier of claim 2, wherein the control unit comprises at least one circuit board assembly disposed inside the at least one chamber.

6. The wearable air purifier of claim 5, wherein the at least one circuit board assembly comprises a plurality of circuit board assemblies electrically connected to each other in a wired manner or in a wireless manner.

7. The wearable air purifier of claim 2, wherein the at least one wearable component comprises a first wearable component and a second wearable component separated from the first wearable component, the first negative ion generating component and the first speaker assembly are disposed on the first wearable component, the second negative ion generating component and the second speaker assembly are disposed on the second wearable component.

8. The wearable air purifier of claim 7, wherein the control unit comprises a first circuit board assembly disposed on the first wearable component and a second circuit board assembly disposed on the second wearable component and electrically connected to the first circuit board assembly in a wired manner or a wireless manner.

9. The wearable air purifier of claim 8, wherein the at least one chamber comprises a first chamber and a second chamber, the first chamber is formed inside the first wearable component, the second chamber is formed inside the second wearable component, the first circuit board assembly is disposed inside the first chamber, and the second circuit board assembly is disposed inside the second chamber.

10. The wearable air purifier of claim 7, wherein the at least one opening comprises a first opening and a second opening, the first opening is formed on the first wearable component, the second opening is formed on the second wearable component, the first negative generating component is partially exposed via the first opening, and the second negative ion generating component is partially exposed via the second opening.

11. The wearable air purifier of claim 1, wherein the control unit comprises at least one circuit board assembly disposed inside the at least one chamber.

12. The wearable air purifier of claim 1, wherein the at least one speaker assembly comprises at least one of a coil, a magnet and a diaphragm.

13. The wearable air purifier of claim 1, wherein the at least one wearable component is a neck-worn component, an ear-worn component, an in-ear component or a head-worn component.

14. The wearable air purifier of claim 1, wherein the at least one speaker assembly is an over-ear speaker assembly, an earbud speaker assembly, an in-ear speaker assembly or a bone conduction speaker assembly.

15. The wearable air purifier of claim 1, wherein the at least one negative ion generating component comprises a fiber bundle, at least one microtube, at least one microneedle or a combination of a baseplate and a plurality of tube structures or wire structures in nano dimension or micro dimension.

16. The wearable air purifier of claim 1, wherein the at least one negative ion generating component is made of electrically conductive material.

17. The wearable air purifier of claim 1, wherein the at least one holding component is made of electrically non-conductive material or electrical resistance material.

* * * * *